Figure 1:
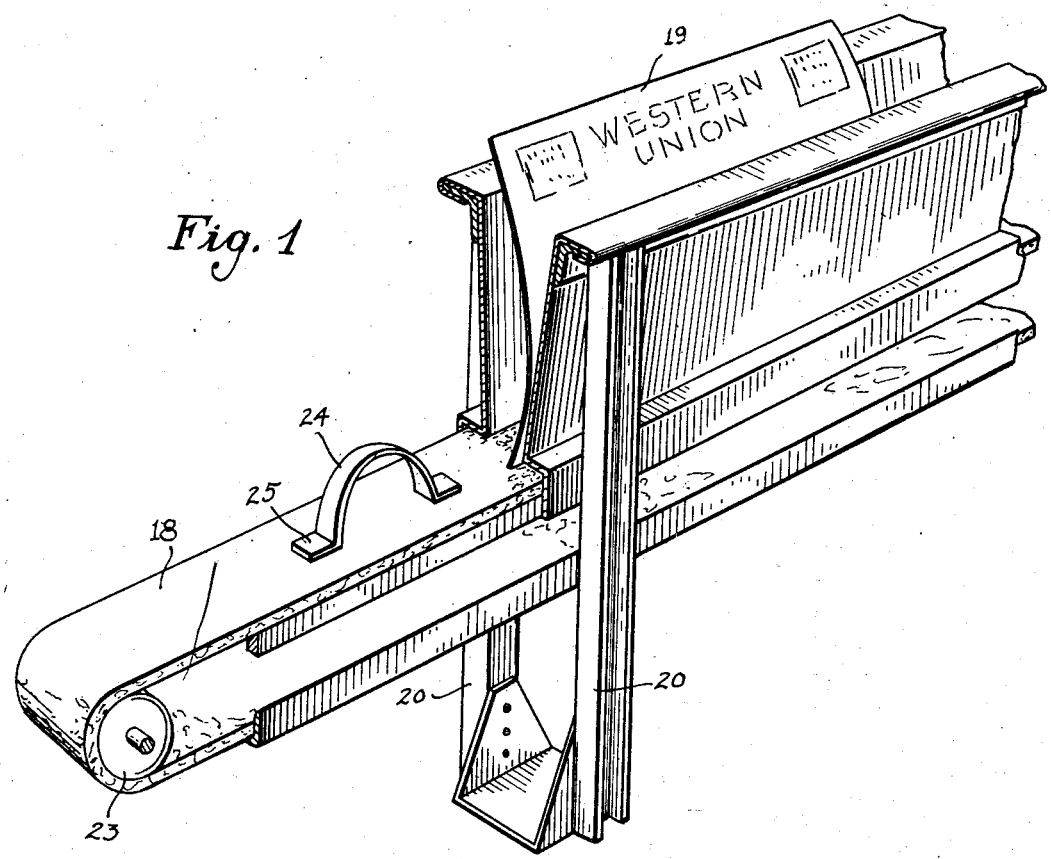

Nov. 24, 1931.  F. GRIFFITH ET AL  1,833,874
CLEARING OUT STRAP FOR BELT CONVEYERS
Filed Nov. 4, 1929

INVENTORS:
Francis Griffith
and Maurice B. Smith
BY
Eugene G. Brown
ATTORNEY

Patented Nov. 24, 1931

1,833,874

UNITED STATES PATENT OFFICE

FRANCIS GRIFFITH, OF PASSAIC, AND MAURICE B. SMITH, OF EAST ORANGE, NEW JERSEY, ASSIGNORS TO THE WESTERN UNION TELEGRAPH COMPANY, OF NEW YORK, N. Y., A CORPORATION OF NEW YORK

CLEARING OUT STRAP FOR BELT CONVEYERS

Application filed November 4, 1929. Serial No. 404,817.

This invention relates to belt conveyers and more particularly to endless belt conveyers for the transportation of flat parcels, such as telegrams, letters and the like, in an upright or vertical position.

In a copending application of d'Humy, Birkmeyer and Griffith, filed March 13, 1929, Serial No. 350,751, and entitled Belt conveyers, now Patent 1,801,906, a belt conveyer of the above nature is described in which an endless belt is operated in a guideway formed by two side plates which extend partially over the top of the belt and which diverge upwardly from the belt to form a substantially V-shaped trough through which the telegram or similar article may be conveyed in a vertical or on edge position. The present invention is in some respects an improvement on the conveyer disclosed in said application, the improvement consisting mainly in the form and construction of the clearing-out members of the belt, which serve to remove any papers or other objects lodged in the trough or between the trough and the belt and to carry the same along the conveyer and in the manner of supporting the return reach of the belt.

In said application the belt is provided at intervals with cross strips or cleats in the form of solid bars which extend substantially from side to side of the upper face of the belt and which serve to remove any obstructing material from the conveyer.

Some difficulty has been experienced with this form of clearing-out members due to loosening of the same from the belt caused by the passage of the belt around the driving and idler pulleys. Moreover the return length of the belt is supported on its face side and beneath the operating length thereof and the cleats interfere with the proper riding of the belt along its supporting members. The cleats moreover require a considerable amount of clearance to be maintained between the belt and the lower end of the trough, and to prevent the sheets from slipping beneath the trough, intermediate the cleats, continuous side flanges are provided on the margins of the belt. The cleats also require the provision of some means for raising the belt above the surface of the return supports sufficiently to prevent the cleats from engaging with the supports. In the aforementioned application this means is provided by the side flanges on the belt which are extended above the top of the cleats. These side flanges, while composed of flexible material, also cause trouble in passing around the driving and idler rollers.

It is one of the objects of the present invention to overcome these difficulties and to provide a clearing-out member for a belt conveyer of the above nature which will readily accommodate itself of the passage of the belt around the supporting rollers.

Another object is to provide a continuous support for the return length of the belt cooperating with said clearing-out members in such a manner that the clearing-out members do not interfere with the return movement of the belt.

Other objects and advantages will appear as the description proceeds.

In accordance with our invention we eliminate the transverse clearing out cleats and side flanges of the belt, leaving the margins of the belt plain and we are thereby enabled to reduce the clearance between the bottom of the trough and the belt so as to reduce the possibility of the lower edge of the sheets lodging between the belt and the base of the trough and in order to definitely remove any portion of a sheet which may become so lodged, we provide a clearing-out member in the form of a strap composed of any suitable material, such as leather, secured at each end to the face of the belt and having a central or intermediate portion arched above the belt and extending upwardly into the trough a substantial distance, for engagement with the parcels or telegrams deposited within the guideway and serving to remove the messages from beneath the lower edge of the trough and belt and to carry the same through the trough. The strap is of a width somewhat less than that of the belt so as to leave the margins of the belt, which extend under the overlying portion of the trough, free. With this construction, as the belt passes around the end rollers the strap merely arches to a greater or less extent and therefore there is no tendency for the same to become detached or loosened from the belt. The return length of the belt is supported on two spaced longitudinally extending members such as a pair of angle irons, which engage the face of the belt only adjacent its edges with the strap depending from the belt between the spaced support members and therefore offering no interference with the return movement of the belt.

Figure 2:
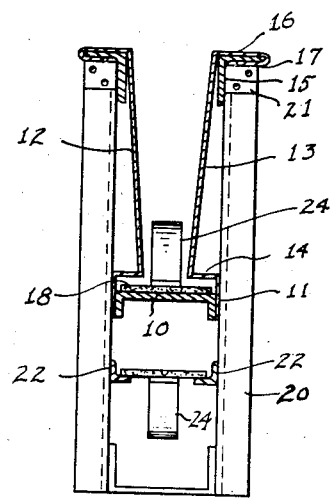

In order that the invention may be more fully understood reference will be had to the accompanying drawings in which Figure 1 is a perspective view, partly in section, of a belt conveyer embodying my invention; and Figure 2 is a vertical sectional view of the conveyer.

The conveyer is provided with a base member 10 consisting of a channel iron having its flanges turned downwardly. To these flanges are secured the vertical edge portions 11 of a pair of side plates 12 and 13. The vertical edged portions 11 project slightly above the channel and the side plates 12 and 13 extend horizontally towards each other from the tops of the edge portions 11 to form belt edge covering flanges 14, from which the side plates extend upwardly and divergently to form the conveyer trough. On the top of the side plates 12 and 13 are stiffening and supporting angles 15 having vertical depending legs and outwardly extending horizontal legs, over the latter of which the side plates are extended outwardly as at 16 and bent around and under as at 17.

There is thus formed a narrow trough with flaring sides and having its bottom opening into a housing for a conveyer belt 18. With this arrangement telegrams or similar articles 19 dropped into the trough will be carried along by the belt in a vertical position, as shown, and the lower portions of the telegrams or other articles are protected, by the overlying portion 14 of the housing, from catching beneath the belt.

Supporting posts or standards 20, which may be composed of channel irons, are used to support the conveyer and each post is provided with a channel cap 21 on which the flange formed by the parts 16 and 17, of the side plates 12 and 13, rest.

The upper reach of the belt, forming the conveyer, travels through the rectangular enclosure or housing at the bottom of the trough and slides on the top of the channel bar 10, which forms the bottom wall of the enclosure. Since the belt is thus continuously supported over its entire run, a uniform clearance is maintained between the belt and the lower end of the trough, permitting the trough to be spaced quite closely to the belt, to reduce the possibility of the lower edge of the messages catching under the trough.

The lower or return reach of the belt is carried on two spaced part angle irons 22 extending longitudinal of the trough beneath the channel 10. The supporting angles 22 are secured to the vertical posts 20.

Adjacent each end of the conveyer the bottom wall 10 of the belt enclosure is discontinued and the belt passes around the driving or idler pulley 23. The conveyer belt is driven in any suitable manner, as by the pulley 23.

At intervals along its length, the belt is provided with clearing-out straps 24, preferably composed of leather or similar material, having the ends 25 secured to the belt and the central portion arched thereabove and extending longitudinal thereof. The straps 24 are disposed centrally of the belt and are of such width as to pass freely through the trough between the side walls 12 and 13 thereof. It will be noted that the strap is continuous across the neck of the trough and projects a substantial distance, somewhat greater than the width of the trough above the belt through the open bottom of the trough.

With this form of clearing-out member there is no tendency for loosening of the same from the belt in passing around the pulleys 23 since the arch of the strap readily increases in height or width to accommodate the same to the change in the relative location of the ends 25 thereof.

The return or lower reach of the belt is supported along its edges only, by the spaced angles 22, with the clearing-out straps 24 depending from the face of the belt between the guide members, thus causing no interference with the return movement of the belt.

In use the telegrams or other papers are simply dropped into the conveyer with the headings upmost and facing in the desired direction. They will travel along the system, being removed at any desired point along the way or being delivered from the end of the conveyer. If a telegram should be held stationary in the trough for any reason, such as static, it can remain stationary only for an instant until it is engaged by one of the clearing-out straps 24, which will thereafter push it to the end of the conveyer. If the lower edges of a message slip between the lower end of the trough and the belt, so that the blank extends diagonally across the trough, from the lower end of one side wall, to the upper edge or intermediate portion of the other side wall, to which it may adhere by static, its passage through the trough will be stopped, blocking the passage of succeeding blanks. The clearing-out members extend sufficiently up into the trough to strike the edge of such messages, but below the point of contact of the message with the trough wall, so as to positively withdraw the lower edge of the message from beneath the trough by a pivoting action about the point of contact of the upper part of the message with the trough wall. The message is thereby freed for further movement through the conveyer.

It will be evident that numerous changes may be made in the exact details of construction without departing from the spirit or essential attributes of the invention and we contemplate all such changes within the scope of our invention.

What we claim is:

1. A conveyer for transporting sheet material in a substantially vertical position and in a substantially horizontal direction comprising a longitudinally extending trough having a depth several times its width, and having an open lower end, a belt support longitudinally co-extensive with the trough, disposed below the open end thereof, an endless belt adapted to travel on said support, the support being spaced uniformly from the lower end of the trough and the margins of the belt beneath the lower end of the trough being plane, whereby uniform clearance is maintained between the belt and trough end, and a clearing-out member secured to the belt entirely within the confines of the open end of the trough, said clearing-out member projecting upwardly from the belt into said trough a distance sufficient to strike the lower portion of sheet material inclined between the upper portion of one wall of the trough and the lower edge of the opposite wall, so as to rock the sheet about its upper portion.

2. A conveyer for transporting sheet material in a substantially vertical position and horizontal direction comprising a longitudinally extending trough, having a depth several times its width and having an open lower end, a belt support disposed below the open end of the trough, an endless belt adapted to travel on said support, the support being spaced uniformly from the lower end of the trough and a clearing-out member secured to the belt and projecting upwardly therefrom into said trough a distance greater than the width of the trough, so as to strike the lower portion of sheet material in the trough to rock the same about its upper portion.

3. A conveyer for transporting sheet material in a substantially vertical position and horizontal direction, comprising a longitudinally extending trough, having a depth several times its width, an endless belt adapted to travel in the base of said trough and a clearing-out member secured to the belt and projecting upwardly therefrom into the trough a distance sufficient to strike the lower portion of sheet material in the trough to rock the same about its upper portion.

4. A conveyer for transporting sheet material in a substantially vertical position and horizontal direction, comprising a longitudinally extending trough, having a depth several times its width and having an open lower end, a belt support disposed below the open end of the trough, an endless belt adapted to travel on said support, the support being spaced from the lower end of the trough, whereby the lower edge of said sheet material may enter beneath the trough and a clearing-out member secured to the belt and projecting upwardly therefrom into the trough and arranged to engage the sheet adjacent the portion thereof projecting beneath the trough, to restore the same into the trough.

In testimony whereof we affix our signatures.

FRANCIS GRIFFITH.
MAURICE B. SMITH.